B. RICHARDSON.
Seed-Planter.
No. 222,078.     Patented Nov. 25, 1879.
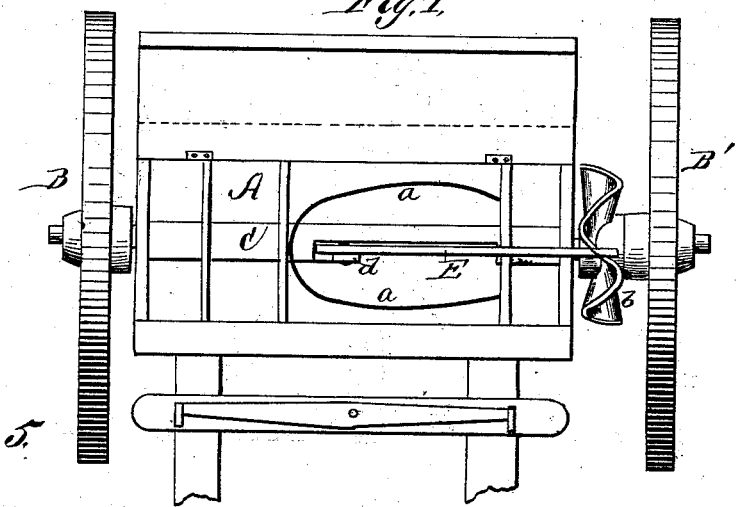
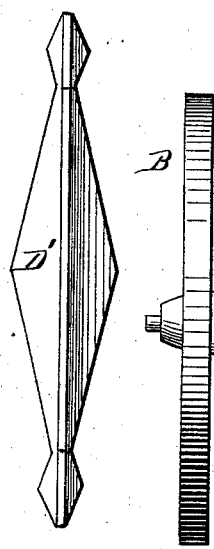
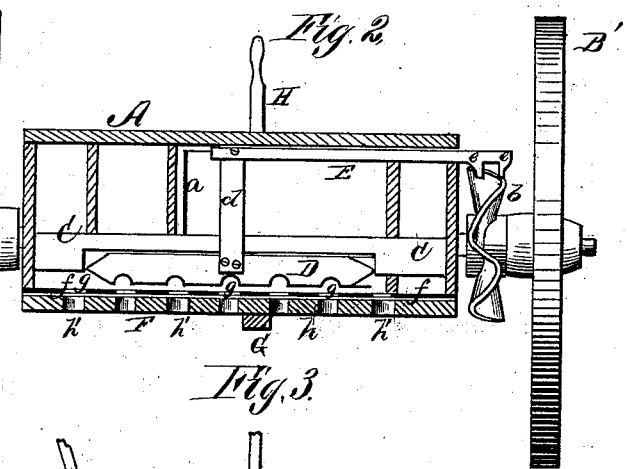
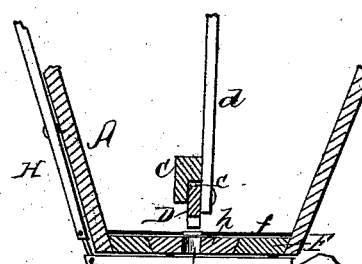
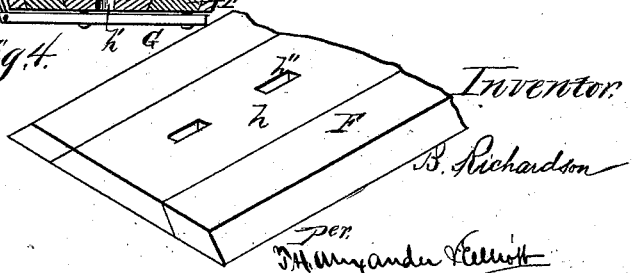
Witnesses:
W. C. McArthur
John C. Rogers
Inventor:
B. Richardson
per
Alexander Elliott
Attorneys.

UNITED STATES PATENT OFFICE.

BENJAMIN RICHARDSON, OF HOULTON, MAINE.

IMPROVEMENT IN SEED-PLANTERS.

Specification forming part of Letters Patent No. 222,078, dated November 25, 1879; application filed October 13, 1879.

*To all whom it may concern:*

Be it known that I, BENJAMIN RICHARDSON, of Houlton, in the county of Aroostook and State of Maine, have invented certain new and useful Improvements in Seed-Planters; and I do hereby declare that the following is a full, clear, and exact description thereof, reference being had to the accompanying drawings, and to the letters of reference marked thereon, which form part of this specification, and in which—

Figure 1 is a plan view with the lid thrown back. Fig. 2 is a central longitudinal section; Fig. 3, a cross-section; Fig. 4, a detail perspective view of the bottom with the grain-slides; and Fig. 5, a detail of a shaker for sowing grass or other fine seed.

The object of my invention is to provide a seed-dropper cheap and simple in construction and not liable to get out of order; and it consists in details of construction and arrangement, as will be more fully set forth hereinafter.

In order to enable others skilled in the art to which my invention appertains to make and use the same, I will now proceed to describe its construction and arrangement.

A represents the seed-box, of any convenient form, to which are attached the wheels B B′.

I provide the interior of the seed-box A with a beam, C, running longitudinally, which beam is provided with a longitudinal groove, $c$, upon its under side, in which runs the shaker or stirrer D. This shaker is a board of convenient length, pointed at each end, and notched at regular intervals upon its lower edge, as seen in Fig. 2, and in its passage to and fro, guided by the groove $c$, stirs up the grain in the bottom of the box and prevents its clogging in the dropping-holes.

To the slide or stirrer D is secured the standard or arm $d$, extending to the top of the box and secured to the horizontal slide-bar E, which passes through a groove or slot in the end of the seed-box, and is provided upon its outer end with two projections, $e\ e$.

The inner end of the hub of the wheel B′ is provided with a cam-wheel, $b$, over which the projections $e\ e$ pass, and as the wheel $b$ revolves a reciprocating motion is imparted to the slide-arm E, arm $d$, and sliding shaker D.

To prevent the grain from clogging the action of the shaker mechanism, it is surrounded by a shield, $a$, preferably of sheet metal, as seen in Fig. 1.

The bottom of the seed-box A is formed of sheet-metal, as seen at $f$, Fig. 2, and provided with holes or perforations $g$, through which the seed passes to the ground. Outside of this sheet-metal bottom $f$ is a wooden bottom, F, as seen in Figs. 2 and 3, which is dovetailed to the sides of the seed-box, and can be removed at will. The center of this bottom F, immediately below the perforations $g$, is also provided with a dovetailed slide, $h$, which is perforated with holes $h'$, corresponding in location and shape with the perforations $g$ in the bottom $f$.

G is a lever, pivoted to the bottom of the seed-box, as seen in Fig. 3, and running transversely across the slide $h$, to which it is also pivoted. This lever extends slightly beyond the rear side of the box, and is connected by a link with a vertical lever, H, fulcrumed to the rear side of the seed-box.

By operating the lever H the end of the transverse lever G is thrown from one side to the other, carrying with it the dovetailed slide $h$, and by this means the flow of seed may be regulated by enlarging or diminishing the escape-holes.

In sowing grass or other fine seed the perforations in the bottoms $f$ and $h$ are too large, and it is necessary to remove them by detaching the lever G and sliding them out of their place, inserting another of the form seen at $h''$ in Fig. 4, in which the escape-holes for the seed are long and narrow and much better adapted to this work.

I also find it better in sowing grass-seed to remove the shaker D, and substitute therefor the one shown in Fig. 5.

Having thus fully described my invention, what I claim as new, and desire to secure by Letters Patent, is—

1. In a seeding-machine, the combination of the dovetailed bottom F with a removable seed-slide dovetailed therein, as and for the purpose set forth.

2. The within-described seeding-machine, consisting, essentially, of dovetailed bottom F and slide h, shield a, and stirrer D, all arranged to operate as and for the purpose set set forth.

In testimony that I claim the foregoing as my own I affix my signature in presence of two witnesses.

BENJAMIN RICHARDSON.

Witnesses:
   ROBT. R. McLEOD,
   W. A. SPROUL.